(12) United States Patent
Palm

(10) Patent No.: US 6,254,326 B1
(45) Date of Patent: *Jul. 3, 2001

(54) SCREW HAVING A TAPERED THREAD

(75) Inventor: Erich Palm, Au (CH)

(73) Assignee: SFS Industrie Holding AG, Heerbrugg (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/319,342
(22) PCT Filed: Oct. 6, 1997
(86) PCT No.: PCT/EP97/05464
  § 371 Date: Jun. 4, 1999
  § 102(e) Date: Jun. 4, 1999
(87) PCT Pub. No.: WO98/27345
  PCT Pub. Date: Jun. 25, 1998

(30) Foreign Application Priority Data

Dec. 16, 1996 (DE) .............................. 196 52 318

(51) Int. Cl.⁷ .................................................. F16B 35/04
(52) U.S. Cl. .......................................... 411/411; 411/399
(58) Field of Search .................................. 411/411, 399, 411/999

(56) References Cited

U.S. PATENT DOCUMENTS

| 984,969 | | 2/1911 | Reiniger . |
|---|---|---|---|
| 1,177,810 | * | 4/1916 | Rogness . |
| 2,167,558 | * | 7/1939 | Upson . |
| 2,321,378 | | 6/1943 | Green . |
| 2,321,379 | | 6/1943 | Green . |
| 2,353,030 | | 7/1944 | Green . |
| 5,205,694 | * | 4/1993 | Nagoshi . |
| 5,919,020 | * | 7/1999 | Walther . |
| 5,941,669 | * | 8/1999 | Aukzemas . |

FOREIGN PATENT DOCUMENTS

| 29616218 | 10/1996 | (DE) . |
|---|---|---|
| 2491563 | 4/1982 | (FR) . |

* cited by examiner

Primary Examiner—Flemming Saether
(74) Attorney, Agent, or Firm—Volpe and Koenig, P.C.

(57) ABSTRACT

In a screw (1) for mutual fastening of two components (2 and 3) there is provided a shank (4) with a thread (6), an unthreaded shank portion (7) and a screw head (5). The end region (8) of the thread (6) adjacent to the unthreaded shank portion (7) tapers with constant thread pitch (S), and so the tapering end region (8) of the thread (6) forms a kind of frustoconical envelope surface (10) upon rotation of the screw (1). During setting of the screw (1) and during over-torquing thereof, the end region (8) of the thread (6) acts as a kind of milling cutter and makes a frustoconical opening (13) in the component (3). The thread flights in the tapering end region (8) can then be braced against the wall of this opening (13), so that mutual contact pressure between the components (2 and 3) is possible despite over-torquing of the screw (1).

9 Claims, 3 Drawing Sheets

SCREW HAVING A TAPERED THREAD

The invention relates to a screw for mutual fastening of at least two components, comprising a shank equipped if necessary at its free end with a boring part or a penetrating point, which shank is provided with a thread extending over part of its length, and also comprising a screw head, wherein an unthreaded shank portion is provided adjoining the screw head.

Screws of this type are used among other purposes for mutual fastening of thin components, such as two sheet-metal parts. The end region of the thread adjacent to the screw head is for practical purposes truncated such that it follows a plane disposed perpendicular to the screw axis, so that the components to be fastened to each other are disposed in the unthreaded shank portion after such a screw has been finally set and bear on both sides against a stop. The one stop then forms the underside of the screw head and the other stop forms the thread end truncated such that it is aligned at right angles to the screw axis. Such a fastener is driven into the components to be joined to each other until the thread on the shank has been passed fully through both components. Thereby threaded engagement is no longer present in the components, and therefore the screw can also be further driven without resulting in over-torquing of the thread in one of the two components.

Such screw designs are already known (for example from U.S. Pat. No. 984,969, U.S. Pat. No. 2,172,258, U.S. Pat. No. 2,321,378, U.S. Pat. No. 2,321,379 and U.S. Pat. No. 2,353,030). In these known embodiments, however, an exact fit between the screw to be inserted and the components to be fastened together is always needed. The length of the unthreaded shank portion between the underside of the screw head and the end of the thread functioning as a stop must be matched exactly to the thickness of the two components. For tolerance reasons, however, and also for reasons of various possible uses of such screws, no other screws can be used for each tenth graduation in thickness of components, and so such known solutions have only limited applicability.

The object of the present invention is to provide a screw of the type mentioned in the introduction, which screw can be used for components having various thicknesses within a specified range and with which over-torquing and mutual contact pressure between the components nevertheless take place.

According to the invention, this is achieved by the fact that the end region of the thread adjacent to the unthreaded shank portion tapers at a sharp angle relative to the screw axis with at least approximately constant thread pitch, the tapering end region of the thread forming a kind of frustoconical envelope surface upon rotation of the screw.

By means of these features according to the invention, the end region of the thread is able to engage to a variable depth in one or even in both components, the thread becoming over-torqued in the engaging part and thereby forming a kind of frustoconical opening at least in the second component. The thread flights of the sharply tapering end region of the thread are braced in this frustoconical opening, which is formed at least in the second component, thus guaranteeing optimal mutual fastening between the two components.

Since it is always guaranteed during the over-torquing process that the components to be mutually fastened will press against each other, it is also ensured in the finally set condition of the screw that the components to be mutually fastened will be mutually fastened in such a manner that they bear tightly against each other.

By means of the sharply tapering end region of the thread, it is possible to span a correspondingly large range of thicknesses of the two components to be fastened to each other, since it is inherently immaterial how deeply this sharply tapering end region of the thread now penetrates into the second component or even into the second and the first component.

During over-torquing of the screw, the mating thread in the components in question is destroyed, while the sharply tapering end region of the thread for practical purposes forms a kind of milling cutter, which makes a kind of frustoconical opening during corresponding rotation of the screw. The sharply tapering end region of the thread then becomes disposed in the manner of a wedge or in the manner of a taper sleeve in the formed frustoconical opening, and so spontaneous reverse rotation of the screw is made impossible. Thus not only is a mutual secure joint between the two components possible, but also the screw is correspondingly locked, so that turning and thus also loosening of the screw is prevented.

To achieve a particular optimal effect, it is provided that the end region of the thread tapers to zero in the unthreaded shank portion. Thereby a correspondingly long end region of the thread can be made to taper sharply as viewed in the axial direction of the screw shank, and so a relatively large range of thicknesses of the components to be fastened can also be spanned with a single fastener.

In one alternative embodiment it is provided that the envelope surface of the tapering end region of the thread is formed by straight generating lines. The thread height in the sharply tapering end region therefore decreases linearly, at least as far as the thread crest at a specified axial sectional plane of the screw is concerned. Thus an opening which for practical purposes is exactly frustoconical is made in at least one of the two components.

Within the scope of the invention it is also possible, however, for the envelope surface of the tapering end region of the thread to be formed by curved generating lines. The opening formed in the component in question by the tapering end region of the thread thereby has a cross section which for practical purposes is curved, so that a kind of bowl shape is cut out in which the end region of the thread is then braced after final setting.

It is further proposed that the minor diameter of the thread in the tapering end region of the thread increases to the same extent as the major diameter of the thread becomes smaller. Thereby the minor diameter merges into the unthreaded shank portion at what for practical purposes is also the correspondingly sharp angle, and so the unthreaded shank portion establishes the centering of the screw in the first component, or in other words in that component on which the screw head eventually bears.

In one alternative embodiment of the invention, it is proposed that the thread is made with multiple flights. With such a design the milling effect of the sharply tapering end region of the thread is further improved, and additional bracing regions are obtained between the tapering end region and the surface of the formed frustoconical opening.

In one particular alternative embodiment it is proposed that a shoulder with diameter larger than that of the remaining unthreaded shank portion be disposed directly adjoining the screw head in the unthreaded shank portion. In this way even more improved centering of the screw in the first component and on the whole even more improved mutual contact pressure between the components to be joined to each other are possible, since corresponding pressure is applied from both sides. On the one hand the larger shoulder must be pressed into the formed opening in the component, and on the other hand the frustoconical opening is milled in the other component, against which opening the sharply tapering end region of the thread can be correspondingly braced.

In this connection it is advantageous for the diameter of the shoulder directly adjoining the screw head to be larger than the boring diameter of a boring part formed at the free end of the shank. The shoulder partly compresses at least the thread portions formed in the first component, and so a corresponding fit is achieved. In this way it is additionally ensured that the components to be fastened to each other are also retained in such a way that they cannot slip transversely relative to the screw axis.

Within the scope of the invention, and especially as regards the formation of an approximately frustoconical opening in the corresponding component, it is advantageous for the component which is remote from the screw head and in which the tapering end region of the thread engages to have a thickness of at least approximately one thread pitch. Thereby it is ensured that the frustoconical opening, which is formed during over-torquing of the fastener, extends over the major part of the thickness of the component or else over the entire thickness of the component. Once again a correspondingly long axial bearing region is then created in order to ensure the necessary axial retention of the screwed joint.

Further features and special advantages according to the invention will be explained in more detail in the following description with reference to the drawings, wherein.

Figure 1:
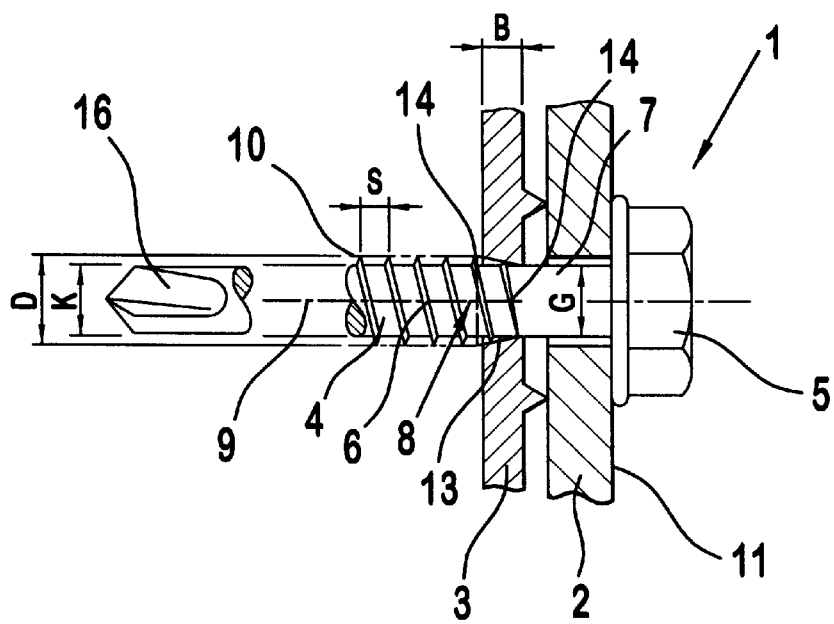
FIG. 1 shows a screw being used for joining two components, the components being illustrated in sectional view.

Screw 1 according to the invention is used for mutual fastening of at least two components 2 and 3. Only two components 2 and 3 are shown in the drawing. However, it would be entirely conceivable to insert yet one further component between these two components 2 and 3, so that then three or if necessary even four components are joined to each other.

Screw 1 comprises a shank 4 and a screw head 5, a thread 6 being provided on shank 4, extending over part of the length thereof. Shank 4 can be equipped at its free end with a boring part 16 or a penetrating point, depending on the material from which components 2 and 3 to be mutually fastened are made. If components 2 and 3 are made of metal, especially steel, a boring part must be used in each case. Should the components or at least one part of the components be made of plastic or of a light metal, a penetrating point may suffice.

Adjacent to screw head 5 there is provided an unthreaded shank portion 7. End region 8 of thread 6 adjacent to unthreaded shank portion 7 tapers at a sharp angle relative to screw axis 9 and also has an at least approximately constant thread pitch S in end region 8. Tapering end region 8 of thread 6 forms a kind of frustoconical envelope surface 10 upon rotation of screw 1. If such a screw 1 is now used for joining two components 2 and 3, then corresponding holes are made at first either with the boring part provided at the free end of the shank or else by previous boring. Thereafter thread 6 of shank 4 engages with first component 2 and then with second component 3. As soon as screw head 5 begins to bear on surface 11 of component 2, with the result that the advance of the screw in the direction of arrow 12 is suppressed, screw 1 slips, and so sharply tapered end region 8 of thread 4 forms, in the region of component 3, as in the illustrated example, a kind of milling cutter, which makes a frustoconical opening 13 in component 3. During this further process of rotation of screw 1, it is always ensured that component 3 is pressed against component 2, so that a correspondingly good mutual joint can also be achieved between the two components 2 and 3. Once frustoconical opening 13 has now been finished after completion of setting of screw 1, the corresponding regions of the thread crests become braced against the surface of opening 13 and thus hold components 3 and 2 in the manner of a wedge effect or in the manner of a taper sleeve. Since the thread profile in opening 13 is destroyed, only the thread crests can still be braced. It is no longer possible for screw 1 to loosen spontaneously, since thread 6 can never penetrate further into the previously formed thread in component 3. If component 3 or even component 2 is made correspondingly thicker, frustoconical opening 13 is disposed correspondingly deeper in component 3 and under some circumstances can even extend as far as component 2. However, a corresponding region of frustoconical opening 13 must still always be present in component 3, since only then is a corresponding pressing force ensured during mutual fastening of components 2 and 3. In each case, however, it can be varied within broad ranges, by the fact that a specified screw length, or in other words a screw having a specified length of unthreaded shank portion 7 and a specified length of sharply tapering end region 8 of thread 6 can be used for relatively broad ranges of thickness of components 2 and 3.

With such a structural geometry a plurality of portions of thread 6 are braced against the inside face of frustoconical opening 13, and so the bracing produced between the screw and the components to be joined to each other occupies a correspondingly large area and in particular has a closed perimeter. Such a variant would not be conceivable if merely the free end of one thread were used as the bracing point for the components to be joined to each other.

End region 8 of the thread tapers to zero into unthreaded shank portion 7, and so for practical purposes an exactly frustoconical opening 13 can be milled, which opening then also tapers directly into unthreaded shank portion 7.

Figure 3:
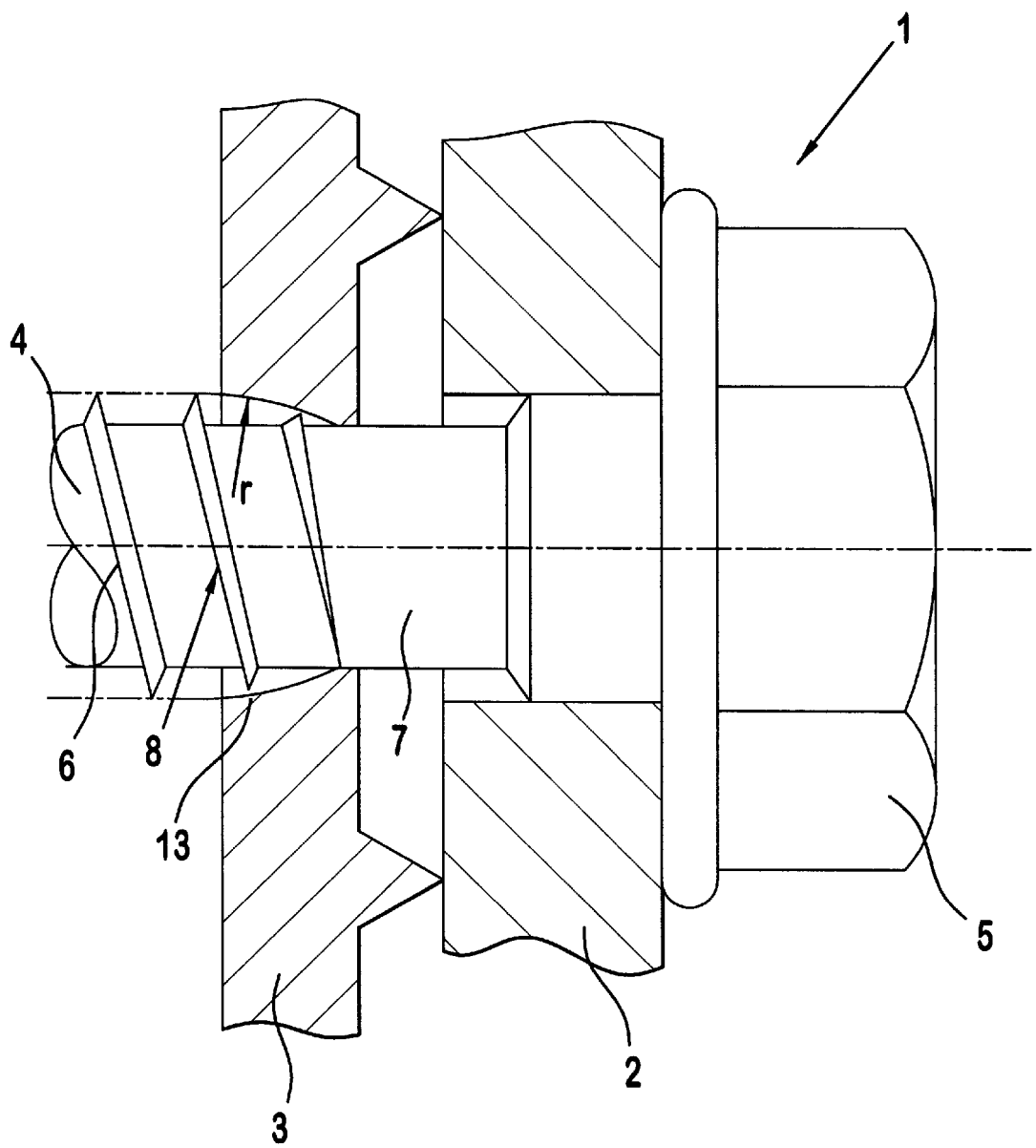
FIG. 3 shows an enlarged diagram of a screw similar to that of FIG. 2, in which the tapered region of the thread is formed by curved generating lines.

Envelope surface 10 of tapering end region 8 of thread 6 can be formed by straight generating lines or else by curved generating lines, as shown for example by the radius or in FIG. 3. In the case of curved generating lines, opening 13 deviates somewhat from frustoconical shape, but in any case a corresponding opening 13 is worked or milled into component 3, which for practical purposes is disposed on the outside. For every special kind of tapering end region 8 of the thread there can be created entirely special shapes of openings 13, which can be used for various materials of components 2 and 3. Openings 13 can therefore be made with geometries ranging from a frustoconical to a potshaped or a stepped frustoconical structure. In the case of straight generating lines for forming envelope surface 10, it is also possible to interpose two or more salient points, so that opening 13 is formed from two or more frustoconical portions adjoining one another. In this case the only important requirement is that an opening 13, which tapers as viewed in the axial direction of the screw and against which tapering end region 8 of thread 6 is braced, be produced by tapering end region 8 of thread 6.

Figure 4:
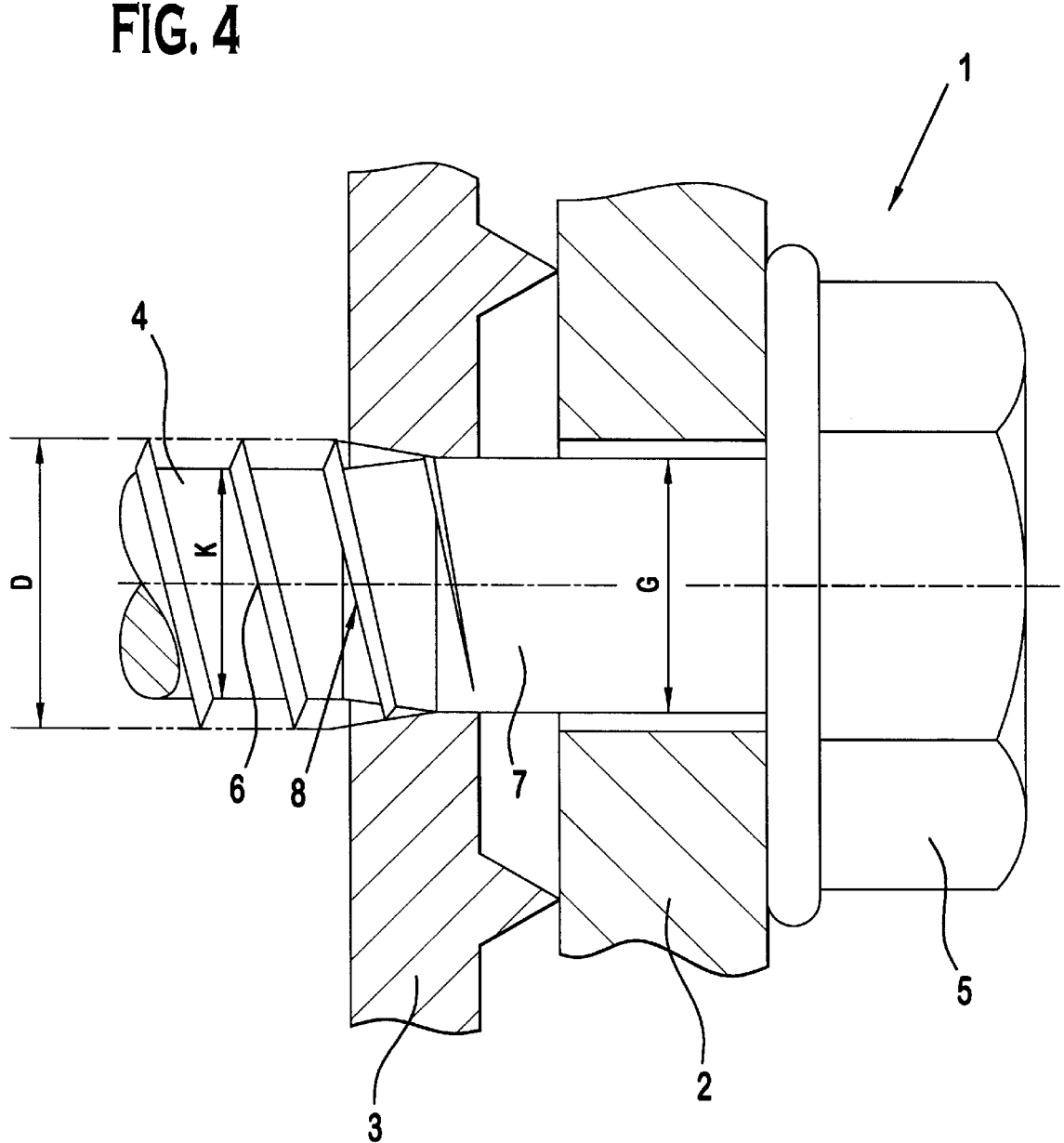
FIG. 4 shows an enlarged diagram of a screw similar to that of FIG. 1, in which the minor diameter increases and the major diameter decreases in the tapering region of the thread.

As shown in the embodiment of FIG. 4, in the tapering end region 8 of thread 6, minor diameter K of thread 6 increases to the same extent as major diameter D of thread 6 becomes smaller. Thereby major diameter D and minor diameter K at the extreme end of end region 8 for practical purposes merge directly into unthreaded shank portion 7 with diameter G.

Within the scope of the invention it is possible to form on shank 4 a multi-flight thread, which under certain circumstances contributes to faster setting and to more exact milling in the region of end region 8. Moreover, it is guaranteed thereby that even larger portions of thread 6 are braced against the bounding faces of opening 13.

Advantageously such a screw 1 is inserted where component 3, which is remote from screw head 5 and in which tapering end region 8 of thread 6 engages, has a thickness B corresponding at least approximately to one thread pitch S. In each case it is practical for at least component 3 to be sufficiently thick that it has appropriate strength such that it cannot be bent in the region surrounding opening 13 during the mutual fastening operation.

Figure 2:
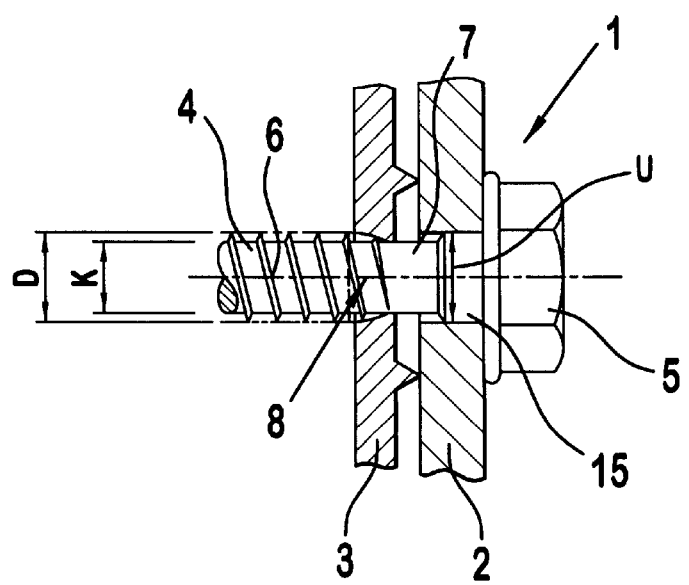
FIG. 2 shows a diagram similar to that of FIG. 1, except that there is provided a different structural geometry of a partial region of the screw.

In the embodiment according to FIG. 2 there is further provided an additional alternative embodiment, according to which a shoulder 15 with diameter larger than that of remaining unthreaded shank portion 7 is provided in unthreaded shank portion 7. Shoulder 15 directly adjoins screw head 5 and establishes centering of the screw in component 2, in which case a thread that may already have been formed in component 2 is partly compressed once again. Diameter U of shoulder 15 is therefore made expediently larger than the boring diameter of a boring part formed at the free end of shank 4.

By means of the screw according to the invention it has become possible to fasten to each other two components for which it is hardly possible to work with a depth stop, and for which disconnection is inherently possible in response to the increase in torque during use of a long thread. Screw 1 can always be appropriately over-torqued, thus enabling a kind of retaining or bracing opening 13 in the manner of a fit to be produced precisely by the special geometry of end region 8 of thread 6. Thereby the thread flights of sharply tapering end region 8 can be braced against the wall of opening 13, so that optimal fastening can be produced in axial direction of the screw and also transverse to the axial direction of the screw.

What is claimed is:

1. A screw for mutual fastening of at least two components, comprising a shank having a free end and an axis (9), the shank being provided with a thread extending over part of its length, and also comprising a screw head, wherein an unthreaded shank portion is provided adjoining the screw head, characterized in that at the end region (8) of the thread (6) adjacent to the unthreaded shank portion (7), the thread tapers inwardly toward said unthreaded shank portion at an acute angle relative to the screw axis (9) with at least approximately constant thread pitch (S), the tapering end region (8) of the thread (6) being adapted to define a corresponding inwardly tapering generally frustoconical envelope surface (10) upon rotation of the screw (1).

2. A screw according to claim 1, characterized in that the end region (8) of the thread (6) tapers to zero in the unthreaded shank portion (7).

3. A screw according to claim 1, characterized in that the envelope surface (10) of the tapering end region (8) of the thread (6) is formed by straight generating lines.

4. A screw according to claim 1, characterized in that the envelope surface (10) of the tapering end region (8) of the thread (6) is formed by curved generating lines.

5. A screw according to claim 1, characterized in that in the tapering end region (8) of the thread (6), the minor diameter (K) of the thread (6) increases in diameter and the major diameter (D) of the thread (6) decreases in diameter.

6. A screw according to claim 1, characterized in that the thread is made with multiple flights.

7. A screw according to claim 1, characterized in that a shoulder (15) with a diameter (U) larger than that of the unthreaded shank portion (7), is disposed directly adjoining the screw head (5).

8. A screw according to claim 7, characterized in that the diameter (U) of the shoulder (15) directly adjoining the screw head (5) is larger than a boring diameter of a boring part formed at the free end of the shank (4).

9. The screw according to claim 1, wherein the free end of the shank includes a boring part or a penetrating point.

* * * * *